Patented Jan. 24, 1950

2,495,286

UNITED STATES PATENT OFFICE 2,495,286

INTERPOLYMERS OF CARBON MONOXIDE AND METHOD FOR PREPARING THE SAME

Merlin M. Brubaker, Chadds Ford, Pa., assignor to E. I. du Pont de Nemours and Company, Wilmington, Del., a corporation of Delaware No Drawing. Application June 8, 1949, Serial No. 97,908

15 Claims. (Cl. 260—63)

This invention relates to new polymers and to methods for their preparation. The present application is a continuation-in-part of my co-pending application, S. N. 552,374, filed September 1, 1944, which in turn is a continuation-in-part of my earlier application, S. N. 449,765, filed July 4, 1942, both now abandoned. In the said applications I have disclosed the interpolymerization of carbon monoxide with unsaturated substances, such as aliphatic monoolefines, fluorinated ethylenes, vinyl and vinylidene compounds.

The use of carbon monoxide as a reagent in the manufacture of organic compounds has long been known in the art. It has been employed in the production of hydrocarbons, alcohols, and esters by treatment with hydrogen in the presence of selected metallic catalysts. Acids and esters have been prepared by treating alcohols or alcoholates with carbon monoxide, and aldehydes and ketones have been synthesized by causing hydrocarbons to react with carbon monoxide and hydrogen chloride in the presence of certain metallic halides. Various other processes include the reaction of low molecular weight unsaturated hydrocarbons with carbon monoxide, or carbon monoxide and hydrogen, to produce higher hydrocarbons or oxygen-containing liquids. All of these processes, however, lead to monomeric or at most, viscous, liquid products.

It is an object of this invention to provide polymers containing carbon monoxide as an essential polymer component. Moreover, it is an object to provide polymers of carbon monoxide with polymerizable organic compounds, and processes for producing such products. It is a more specific object to provide new polymers of carbon monoxide with polymerizable organic compounds containing ethylenic unsaturation. Another object is to provide orientable carbon monoxide interpolymers characterized by high tensile strength, superior film and fiber-forming properties, and high intrinsic viscosity. It is a still further object to provide a simple direct process for obtaining such polymers. Other objects will appear hereinafter.

According to this invention, a process is provided for converting carbon monoxide and other monomers into polymeric materials of high quality including orientable solid polymers. In one embodiment, carbon monoxide is polymerized with polymerizable organic compounds containing ethylenic unsaturation, in the presence of a peroxy catalyst and in the absence of a Friedel-Crafts catalyst, to yield normally solid carbonyl group-containing polymers. In the preferred mode of operation, the polymerizable organic compounds and carbon monoxide are heated together under pressure in the presence of an organic peroxide catalyst and in the absence of a Friedel-Crafts catalyst. The polymerization can be carried out either as a batch, semi-continuous, or continuous operation. It is generally conducted in vessels which are either constructed of or lined with glass, stainless steel, silver, etc.

By "polymerizable organic compounds containing ethylenic unsaturation" is meant compounds which contain the group $>C=C<$ and which, in accordance with the present state of the art, are recognized as being capable of undergoing a polymerization reaction involving addition across the ethlyenic double bond, which reaction is catalyzed by peroxy compounds.

The polymerizable organic compounds used in the practice of this invention include any organic compound containing ethylenic unsaturation and capable of being polymerized through the ethylenic double bond. A class of these compounds which, as the art has now developed, is cognizable under the term "peroxide-polymerizable" embraces aliphatic monoolefines: ethylene; propylene; the butylenes; butadiene; vinyl and vinylidene compounds; fluorinated ethylenes; i. e., vinyl fluoride, vinylidene fluoride, trifluoroethylene and tetrafluoroethylene; vinyl chloride; vinylidene chloride; organic vinyl esters such as vinyl propionate, vinyl benzoate, vinyl acetate, vinyl isobutyrate, vinyl laurate, etc.; vinyl ketones such as methyl vinyl ketone and methyl isopropenyl ketone; styrene; acrylic and methacrylic acids and their derivatives such as esters, nitriles, and anhydrides; diallyl compounds such as diallyl phthalate; butenedioic acids and their derivatives, such as maleic and fumaric acids, their esters, nitriles and anhydrides, and the like. Combinations of ethylene with one or more additional polymerizable organic compounds are particularly useful for polymerization with carbon monoxide in the practice of this invention. Organic compounds which contain at least one terminal methylene group are preferred for polymerization with carbon monoxide in the practice of this invention since the most satisfactory results with respect to yield and polymer quality are obtained when such compounds are used.

As catalysts for use in this invention, any peroxy compound can be used. Within the scope of the term "peroxy compound" is meant to be included any compound which is capable of inducing vinyl polymerization and which contains the bivalent group, —O—O—. Examples of such compounds are oxygen, benzoyl peroxide, lauroyl peroxide, succinoyl peroxide, diphthalic acid peroxide, dioxan peroxide, diethyl dioxide, peracetic acid, perbenzoic acid, potassium peroxydisulfate, ammonium peroxydisulfate, sodium and potassium percarbonates, and the like. Other operable catalysts are azines such as diphenylketazine and benzalazine, and organo lead compounds such as diethyl lead dibromide. In general, compounds which readily form free radicals under the polymerization conditions may be employed as catalysts.

The concentration of catalysts required in the practice of this invention may vary over a wide range. For reasons of economy and in order to obtain products of relatively high molecular weight, however, it is generally desirable to use low concentrations of catalysts, for example, from about 0.01% to about 1%, based on the amount of polymerizable monomers. Lower molecular weight products may be desirable for many uses, and these are conveniently prepared with catalyst concentrations up to 15% or more.

Although use of an added reaction medium is not essential to operability, a liquid is usually added to serve as a reaction medium. As reaction media for selected polymerizations there can be used water or any non-polymerizable, normally liquid, preferably volatile organic compound of the following classes: hydrocarbons, halogenated hydrocarbons, alcohols, ethers, esters, ketones, or nitroparaffins. Specific examples are benzene, isooctane, cyclohexane, dioxan, tertiary butyl alcohol, methyl formate, tetraethyl silicate, carbon tetrachloride, acetone, nitromethane, etc. Of these, anhydrous, thiophene-free benzene is preferable for use in polymerizations involving both carbon monoxide and ethylene because of its inertness. Mixtures of two or more such materials can sometimes be employed advantageously. Some of the added reaction media may also function as reactants and, as such, may exert a profound influence on the nature of the resulting polymer. Thus, the choice of reaction medium usually depends upon the nature of the materials to be polymerized with carbon monoxide and the type of polymer desired. Since water, even in minor amounts, usually has an adverse effect on the polymerization of carbon monoxide with ethylene, the organic reaction media used in polymerizations involving both carbon monoxide and ethylene are preferably carefully dried before use.

It should be noted that in the polymerization of carbon monoxide with vinyl chloride the pH of the reaction mixture should be maintained, preferably, on the acid side throughout the reaction. Similarly, in the case of tetrafluoroethylene, it is preferable to operate at a pH of about 3, which is obtained by adjusting the pH of the original charge with an acid such as formic acid. With respect to the polymerization of carbon monoxide with acrylonitrile, it has been found that a hydrohalic acid such, preferably, as hydrochloric acid, should be present in such an amount as to produce a pH of 1 or less. Furthermore, it is desirable to employ concentrations not exceeding 20% of hydrochloric acid because at higher concentrations of acid the acrylonitrile tends to hydrolyze with sacrifice in yield of polymer.

For best results reactants and any added liquid reaction media are carefully purified before use. Although oxygen is an operable catalyst in this invention, it usually has a deleterious effect in polymerizations involving use of another peroxy compound as catalyst. Therefore, oxygen is preferably excluded from the reaction vessel during polymerization. The process of this invention is operable when the gaseous reactants contain 200 or more parts of oxygen per million parts of reactant, but it is desirable and not unduly troublesome and expensive to hold the oxygen concentration below 20 parts per million. Water is usually likewise undesirable in polymerizations involving carbon monoxide and ethylene. It may be conveniently removed from these reactants by passing them through a bed of activated alumina.

Carbon monoxide for use in the process of this invention may be obtained from any source, for example, by the action of steam or carbon dioxide on hot coal, by the reaction of methane with steam, or by the decomposition of formic acid or methyl formate. It is preferably free of metal carbonyls such as iron carbonyl, nickel carbonyl, and copper carbonyl. In order to insure uniformity of polymer composition, carbon monoxide introduced into the recation vessel during the polymerization reaction is preferably introduced simultaneously with the other polymer ingredients in a definite predetermined ratio.

The process of this invention may be carried out at temperatures varying from 25° C. to as high as 350° C. or higher. The optimum temperature in each case depends upon the nature of the materials to be polymerized, the reaction medium, the catalyst, the pressure, and the type of polymer desired. If products of maximum molecular weight are desired it is usually desirable to operate at the lowest temperatures possible consistent with a reasonable reaction rate. Use of higher temperatures usually leads to lower molecular weight products which are lower-softening and more soluble. In most cases the preferred temperature is between 50° and 250° C. Optimum temperatures can readily be determined for each polymerization system by carrying out a few preliminary experiments.

The molecular weight of the polymers of this invention is also a function of the pressure used in their preparation; increased pressure usually leads to products of higher molecular weight. The polymerization can be carried out at superatmospheric pressures. Pressures ranging from atmospheric to 3000 atmospheres and above may be used, depending upon the reactants, catalysts, reaction media, temperature, and mechanical limitations of the equipment. It is generally preferred to operate at pressures within the range of from 20 to 1500 atmospheres. Thus, the normally solid ethlyene/carbon monoxide polymers are most conveniently prepared at pressures of about 500 to 1000 atmospheres.

The following examples illustrate the practice of this invention and demonstrate operable conditions. Parts given are by weight unless otherwise specified. The pressure reaction vessel used in each example is lined with silver, although reaction vessels made of or lined with any other inert material may be employed, as desired. In each case unless otherwise specified, the reactor is flushed with oxygen-free nitrogen to displace atmospheric oxygen immediately before the catalyst, reaction medium, and reactants are added.

*Example 1.*—This example illustrates the benzoyl peroxide-catalyzed polymerization of carbon monoxide and ethylene in water.

A pressure reaction vessel is charged with 0.5 part of benzoyl peroxide and 125 parts of water, closed, evacuated, pressured to 325 atmospheres with carbon monoxide, and then further pressured to 500 atmospheres with ethylene. The temperature of the agitated reaction mixture is raised to 115° C. and maintained at 114° to 116° C. for a period of 11 hours during which the pressure is kept at 920 to 940 atmospheres by occasional repressuring with ethylene. The vessel is cooled, the excess gases are bled off, and the vessel is opened. The polymer is isolated by filtration and dried. There is thus obtained 0.25 part of a polymer having a melting point of 200° to 202° C. and giving a positive color test for keto groups with meta-dinitrobenzene and alcoholic potassium hydroxide (Biochem. J. 32, 1312 (1938)). The mol ratio of ethylene to carbon monoxide in the polymer is 1.2:1. The polymer is soluble in dimethyl formamide and insoluble in toluene, methanol, acetone, and acetic acid.

*Example 2.*—This example illustrates the benzoyl peroxide-catalyzed polymerization of carbon monoxide and ethylene in the absence of an added reaction medium.

A pressure reaction vessel is charged with 0.5 part of benzoyl peroxide, closed, evacuated, and pressured to 700 atmospheres with a mixture of carbon monoxide and ethylene which mixture contains 50% carbon monoxide by weight. The temperature of the agitated reaction mixture is raised to 75° C. and maintained at 73° to 77° C. for a period of 13 hours during which the pressure is kept at 860 to 1000 atmospheres by occasional repressuring with the mixture of carbon monoxide and ethylene. The vessel is cooled, the excess gases are bled off, and the vessel is opened. There is thus obtained 18 parts of a white, finely divided polymer which melts to a clear liquid when dropped on a metal surface heated to 191° to 192° C. or higher temperatures. Within two minutes the melt gels and the gel remains soft and rubbery until it is cooled, when it becomes hard and brittle. The mol ratio of ethylene to carbon monoxide in the polymer is 1.16:1. The polymer is slightly soluble in chloroform, hot dioxane, hot nitroethane, and hot pyridine. It becomes insoluble in these solvents when it is heated at 130° C. for 16 hours or at 160° C. for 30 minutes. One part of the polymer mixed intimately with one part of wood flour and molded at 2000 lbs. per sq. inch and 160° C. for 10 minutes forms a bar which has an impact strength of 0.37 lbs. per inch of notch (Charpy method, pages 67–70, Handbook of Plastics, Simonds and Ellis, D. Van Nostrand and Co., N. Y. C., 1943).

*Example 3.*—This example illustrates the diethyl dioxide-catalyzed polymerization of carbon monoxide and ethylene introduced into the reactor as a 70:30 mixture by weight, in the absence of an added reaction medium.

A pressure reaction vessel is charged with 0.5 part of diethyl dioxide, closed, and pressured to 350 atmospheres with a mixture of carbon monoxide and ethylene which mixture contains 70% carbon monoxide by weight. The temperature of the agitated reaction mixture is raised to 120° C. and maintained at 118° to 123° C. for a period of 14.5 hours during which the pressure is kept at 700 to 775 atmospheres by occasional repressuring with the mixture of carbon monoxide and ethylene. The vessel is cooled, the excess gases are bled off, and the vessel is opened. There is obtained 55 parts of a white, finely divided polymer which softens but does not appear to melt under ordinary pressures up to 250° C. The mol ratio of ethylene to carbon monoxide in the polymer is 1.30:1. A film pressed from the polymer between smooth surfaces at 180° C. is transparent and brittle and has a tensile strength of 2640 lbs. per sq. inch with an elongation at break of 14%. One part of the polymer mixed intimately with one part of wood flour and molded at 1000 lbs. per sq. inch and 170° C. for 3 minutes forms a bar which has an impact strength of 0.50 ft. lb. per inch of notch (Charpy).

*Example 4.*—This example illustrates the formation of a crystalline, orientable polymer from a 30:70 mixture of carbon monoxide and ethylene by weight with diethyl dioxide as catalyst.

A pressure reaction vessel is charged with 0.5 part of diethyl dioxide, closed, and pressured to 500 atmospheres with a mixture of carbon monoxide and ethylene which mixture contains 30% carbon monoxide by weight. The temperature of the agitated reaction mixture is raised to 130° C. and maintained at 129° to 131° C. for 14 hours during which time the pressure is kept at 850 to 1000 atmospheres by occasional repressuring with the mixture of ethylene and carbon monoxide. The vessel is cooled, the excess gases are bled off, and the vessel is opened. There is obtained 101 parts of fused tough polymer which softens but does not appear to melt under ordinary pressures up to 250° C. The mol ratio of ethylene to carbon monoxide in the polymer is 1.25:1. The infrared absorption spectrum of the polymer affords ample evidence of the presence of keto groups in the polymer. The polymer is highly swelled by and partially soluble in chloroform. It mills satisfactorily on a Thropp rubber mill at 120° to 130° C. A sheet of the polymer removed from the rubber rolls and rolled at 50° C. from its original thickness of 25 to 30 mils to a thickness of 6 mils has a tensile strength of 2840 lbs. per sq. inch in the direction of roll, with an elongation at break of 16%. X-ray diagrams of the transparent rolled film show that the polymer has a crystalline structure and that the film is highly oriented in the direction of roll. The film pressed from the polymer between smooth surfaces at 160° C. is hazy and mottled in appearance. Its tensile strength is 2020 lbs. per sq. inch with an elongation at break of 24%. Bars molded at 150° C., either in compression or injection molding equipment, have a tensile strength of 2000 to 2500 lbs. per sq. inch. When the polymer is milled for 10 to 15 minutes on tight, unheated rubber mill rolls, it becomes completely and readily soluble in chloroform or hot dioxan. This soluble polymer has an intrinsic viscosity of 1.0 (determined at 25° C. in chloroform at a concentration of 0.1 g. per 100 ml. of solution; intrinsic viscosity is defined in U. S. Patent 2,130,948).

*Example 5.*—This example illustrates the use of tertiary butyl hydroperoxide as a catalyst for the polymerization of carbon monoxide and ethylene.

A pressure reaction vessel is charged with 0.25 part of a 62.5% solution of tertiary butyl hydroperoxide in tertiary butyl alcohol, closed, and pressured to 450 atmospheres with a mixture of carbon monoxide and ethylene which mixture contains 20% carbon monoxide by weight. The temperature of the agitated reaction mixture is raised to 130° C. and kept at 129° to 132° C. for a period of 15 hours during which time the pressure is maintained at 850 to 1000 atmospheres. The vessel is cooled, the excess gases are bled off, and the vessel is opened. There is obtained 42 parts of fused tough polymer with properties much like those of the polymer obtained in Example 4. The mol ratio of ethylene to carbon monoxide in the polymer is 1.50:1.

*Example 6.*—This example illustrates the polymerization of carbon monoxide and ethylene in isooctane to obtain a soluble polymer.

A pressure reaction vessel is charged with 0.5 part of diethyl dioxide and 100 parts of isooctane, closed, evacuated, and pressured to 450 atmospheres with a mixture of carbon monoxide and ethylene which mixture contains 10% carbon monoxide by weight. The temperature of the agitated reaction mixture is raised to 131° C. and maintained at 128° to 132° C. for a period of 7.5 hours during which the pressure is kept at 840 to 1000 atmospheres by occasional repressuring with the mixture of ethylene and carbon monoxide. The vessel is cooled, the excess gases are bled off, and the vessel is opened. The polymer is milled on hot rubber rolls to remove the isooctane. The yield of dry polymer is 59 parts. It melts at 84° C. A film pressed at 80° C. between smooth surfaces is transparent and pliable and has a tensile strength of 960 lbs. per sq. inch with an elongation at break of 50%. The polymer is soluble in chloroform or hot dioxan and has an intrinsic viscosity of 0.39 (determined in dioxan at 85° C. at a concentration of 0.1 g./100 ml. of solution). The mol ratio of ethylene to carbon monoxide in the polymer is 3.4:1.

*Example 7.*—This example illustrates the formation of a soluble, relatively high-viscosity polymer from a 2:98 mixture of carbon monoxide and ethylene by weight.

A pressure reaction vessel is charged with 0.25 part of diethyl dioxide and 100 parts of thiophene-free benzene containing less than 0.01% water by weight, closed, evacuated, and pressured to 400 atmospheres with a mixture of carbon monoxide and ethylene which mixture contains 2% carbon monoxide by weight. The temperature of the agitated reaction mixture is raised to 130° C. and maintained at 128° to 136° C. for a period of 17.5 hours during which the pressure is kept at 800 to 985 atmospheres by occasional repressuring with the mixture of ethylene and carbon monoxide. The vessel is cooled, the excess gases are bled off, and the vessel is opened. The polymer is milled on hot rubber rolls to remove the benzene. The yield of dry polymer is 66 parts. The mol ratio of ethylene to carbon monoxide in the polymer is 20:1 and its intrinsic viscosity is 1.08 (determined in xylene at 85° C. and a concentration of 0.125 g. per 100 ml. of solution). A film pressed from the polymer between smooth surfaces at 140° C. is transparent and has a tensile strength of 1230 lbs. per sq. in. with an elongation at break of 390%. The specimens used in the tensile strength test become oriented (i. e. strengthened in the direction parallel to the direction of the stress) as they are drawn out.

*Example 8.*—This example illustrates the preparation of a highly orientable polymer from a 1:199 mixture of carbon monoxide and ethylene by weight.

A pressure reaction vessel is charged with 0.1 part of diethyl dioxide and 100 parts of thiophene-free, anhydrous benzene, closed, evacuated, and pressured to 250 atmospheres with a mixture of carbon monoxide and ethylene which mixture contains 0.5% carbon monoxide by weight. The temperature of the agitated reaction mixture is raised to 125° C. and maintained at 123° to 130° C. for a period of 16 hours during which the pressure is kept at 650 to 750 atmospheres by occasional repressuring with the mixture of carbon monoxide and ethylene. The vessel is cooled, bled of excess gases, and opened. The polymer is milled on hot rubber rolls to remove the benzene. The yield of dry polymer is 61 parts. The infrared absorption spectrum of the polymer indicates a carbon monoxide content of about 1%. A film pressed from the polymer between smooth surfaces at 160° C. is transparent and has a tensile strength of 2880 lbs. per sq. inch with an elongation at break of 590%. The intrinsic viscosity of the polymer (determined in xylene at 85° C. at a concentration of 0.125 g./100 ml. of solution) is 1.12 and its melting point is 210° C. Films cast from a 20% solution of the polymer in hot xylene and cooled rapidly after evaporation of the solvent at 105° C. are clear and have high tear strength. Yarn spun from the xylene solution of the polymer is highly oriented by cold drawing and is colored more deeply by cellulose acetate type dyes than is polyethylene yarn.

*Example 9.*—This example illustrates the polymerization of carbon monoxide and ethylene in a medium comprising both dioxan and benzene.

A pressure reaction vessel is charged with 0.5 part of diethyl dioxide, 50 parts of thiophene-free benzene, and 50 parts of dioxan, closed, evacuated, and pressured to 275 atmospheres with a mixture of carbon monoxide and ethylene which mixture contains 30% carbon monoxide by weight. The temperature of the agitated reaction mixture is raised to 130° C. and maintained at 129° to 135° C. for a period of 3.5 hours during which the pressure is kept at 600 to 760 atmospheres by occasional repressuring with the mixture of ethylene and carbon monoxide. The reaction vessel is cooled, the excess gases are bled off, and the vessel is opened. The polymer is milled on hot rubber rolls to remove the dioxan and benzene. The yield of dry polymer is 44 parts. The mol ratio of ethylene to carbon monoxide in the polymer is 1.3:1. It is completely soluble in chloroform and hot dioxan and has an intrinsic viscosity of 0.30 (determined at 25° C. in chloroform at a concentration of 0.1 g./100 ml. of solution). It reacts readily with hydroxylamine to form a polyoxime, and with formamide and formic acid to form a soluble nitrogen-containing product. It also reacts readily with ethane-dithiol in dioxan containing anhydrous hydrogen chloride to form a sulfur-containing derivative, presumably a dithiolane. The polymer also reacts readily with formaldehyde under alkaline conditions to form a soluble methylol derivative which when heated with an acid catalyst becomes hard, brittle and insoluble and is thus useful as a basis for thermosetting molding powders.

*Example 10.*—This example illustrates the preparation of an orientable polymer from carbon monoxide, ethylene, and propylene with benzoyl peroxide as catalyst.

A pressure reaction vessel is charged with 0.5 part of benzoyl peroxide, closed, and evacuated. Then 53 parts of propylene is added and the vessel is pressured to 150 atmospheres with ethylene and then to 500 atmospheres with carbon monoxide. The temperature of the agitated reaction mixture is raised to 75° C. and maintained at 73° C. to 77° C. for a period of 10 hours during which the pressure is kept at 760 to 975 atmospheres by occasional repressuring with carbon monoxide. The vessel is cooled, the excess gases are bled off, and the vessel is opened. The resulting 8 parts of polymer is milled on hot rubber rolls. Its intrinsic viscosity (determined at 25° C. in chloroform at a concentration of 0.1 g./100 ml. of solution) is 0.37 and its carbon monoxide content is 43% by weight. It melts at 105° C. A film pressed at elevated temperatures between smooth surfaces has a tensile strength of 1870 lbs. per sq. inch with an elongation at break of 32%. A sample of the film becomes oriented when it is rolled between cold rolls to twice its original length.

*Example 11.*—This example illustrates the preparation of an elastomeric polymer of carbon monoxide, ethylene, and propylene with diethyl dioxide as catalyst.

A pressure reaction vessel is charged with 0.5 part of diethyl dioxide and 100 parts of thiophene-free benzene, closed, and evacuated. Then 43 parts of propylene is added and the vessel is pressured to 300 atmospheres with a mixture of ethylene and carbon monoxide which mixture contains 70% carbon monoxide by weight. The temperature of the agitated reaction mixture is raised to 130° C. and maintained at 129° to 134° C. for a period of 16.5 hours during which the pressure is kept at 860 to 1000 atmospheres by occasional repressuring with the mixture of ethylene and carbon monoxide. The vessel is cooled, the excess gases are bled off, and the vessel is opened. The polymer, yield 26 parts, is milled on warm rubber rolls to remove the benzene. At room temperature on the rubber rolls it behaves much like rubber. It contains 41% carbon monoxide by weight, and the presence of propylene as a polymer component is apparent from its infra-red absorption spectrum. Its intrinsic viscosity (determined at 25° C. in chloroform at a concentration of 0.1 g./100 ml. of solution) is 0.56 and its melting point is 172° C. A film pressed from the polymer at 90° C. between smooth surfaces is transparent and pliable (bending modulus equals 900 lbs. per sq. inch with an elongation at break of 210%.) The elastic recovery of a sample of the film is 77% from a stretch of 200%.

*Example 12.*—This example illustrates the preparation of a polymer of carbon monoxide, ethylene, and isobutylene.

A pressure reaction vessel is charged with 0.5 part of diethyl dioxide and 100 parts of thiophene-free benzene, closed and evacuated. Then 22 parts of isobutylene is added and the vessel is pressured to 450 atmospheres with a mixture of carbon monoxide and ethylene which mixture contains 30% carbon monoxide by weight. The temperature of the agitated reaction mixture is raised to 130° C. and maintained at 130° to 132° C. for a period of 17 hours during which the pressure is kept at 850 to 1000 atmospheres by occasional repressuring with the mixture of ethylene and carbon monoxide. The vessel is cooled, the excess gases are bled off, and the vessel is opened. The polymer, yield 22 parts, is milled on warm rubber rolls to remove the benzene. It contains 39% carbon monoxide by weight and the presence of isobutylene as a polymer component is apparent from its infrared absorption spectrum. The intrinsic viscosity of the polymer is 0.55 (determined at 25° C. in chloroform at a concentration of 0.1 g./100 ml. of solution) and its melting point is 128° C. It forms a clear solution in chloroform. A film cast from the solution on a glass plate is smooth, clear and colorless. A film pressed at 110° C. between smooth surfaces is clear and has a tensile strength of 1900 lbs. per sq. inch with an elongation at break of 364%.

*Example 13.*—This example illustrates the preparation of a polymer of carbon monoxide, ethylene, and butadiene.

A pressure reaction vessel is charged with 0.5 part of diethyl dioxide and 100 parts of thiophene-free benzene, closed, and evacuated. Then 13 parts of butadiene is added and the vessel is pressured to 450 atmospheres with a mixture of carbon monoxide and ethylene which mixture contains 30% carbon monoxide by weight. The temperature of the agitated reaction mixture is raised to 130° C. and maintained at 126° to 131° C. for a period of 17 hours during which the pressure is kept at 940 to 1000 atmospheres by occasional repressuring with the mixture of ethylene and carbon monoxide. The vessel is opened. The reaction mixture is filtered through cheesecloth to remove the clear insoluble gel which amounts to 3 parts. After the benzene is removed from the clear filtrate in a current of nitrogen, there remains two parts of a clear colorless oil which is soluble in chloroform. Its iodine number is 210. Its composition, calculated from this value and its carbon and hydrogen content is 13% carbon monoxide, 37% ethylene, and 50% butadiene by weight. Films cast on glass from a benzene solution of this polymer dry in two days at room temperature or in 1 hour at 110° C. to hard, tack-free, tough, colorless films without use of metallic driers.

*Example 14.*—This example illustrates the preparation of a polymer of carbon monoxide, ethylene, and diallyl phthalate.

A pressure reaction vessel is charged with 0.5 part of diethyl dioxide, 10 parts of diallyl phthalate, 50 parts of dioxan, and 50 parts of thiophene-free benzene, closed, evacuated and pressured to 300 atmospheres with a mixture of ethylene and carbon monoxide which mixture contains 30% carbon monoxide by weight. The temperature of the agitated reaction mixture is raised to 130° C. and maintained at 128° to 131° C. for a period of 4.5 hours during which the pressure is kept at 600 to 700 atmospheres by occasional repressuring with the mixture of carbon monoxide and ethylene. The vessel is cooled, the excess gases are bled off, and the vessel is opened. The polymer, yield 24 parts, is freed of benzene, dioxan, and unreacted diallyl phthalate by distillation of these volatile materials with steam. The polymer is spongy in form, infusible, and insoluble in acetone, chloroform, and dioxan.

*Example 15.*—This example illustrates the preparation of a polymer of carbon monoxide, ethylene, and vinyl acetate.

A pressure reaction vessel is charged with 0.5 part of diethyl dioxide, 20 parts of vinyl acetate, 50 parts of dioxan, and 50 parts of thiophene-free benzene, closed, evacuated, and pressured to 250 atmospheres with a mixture of carbon monoxide and ethylene which mixture contains 30% carbon monoxide by weight. The temperature of the agitated reaction mixture is raised to 130° C. and maintained at 127° to 140° C. for a period of 5.5 hours during which the pressure is kept at 600 to 700 atmospheres by occasional repressuring with the mixture of ethylene and carbon monoxide. The vessel is cooled, the excess gases are bled off, and the vessel is opened. The polymer, yield 60 parts, is milled on warm rubber rolls to remove dioxan, benzene, and unreacted vinyl acetate. Its composition is 37% carbon monoxide, 52% ethylene, and 11% vinyl acetate by weight. Its intrinsic viscosity (determined at 25° C. in chloroform at a concentration 0.1 g./100 ml. of solution) is 0.33 and its melting point is 115° C. A film pressed from the polymer at 100° C. between smooth surfaces is clear and fairly pliable and has a tensile strength of 1760 lbs. per sq. inch with an elongation at break of 80%.

*Example 16.*—This example illustrates the preparation of a polymer of carbon monoxide, ethylene, and diethyl maleate.

A pressure reaction vessel is charged with 0.5 part of diethyl dioxide, 10 parts of diethyl maleate, and 100 parts of dioxan, closed, evacuated, and pressured to 250 atmospheres with a mixture of carbon monoxide and ethylene which mixture contains 30% carbon monoxide by weight. The temperature of the agitated reaction mixture is raised to 130° C. and maintained at 129° to 142° C. for a period of 3 hours during which the pressure is kept at 500 to 700 atmospheres by occasional repressuring with the mixture of carbon monoxide and ethylene. The vessel is cooled, excess gases are bled off, and the vessel is opened. The polymer, yield 32 parts, is freed of dioxan and unreacted diethyl maleate by distillation of these volatile materials with steam. It is then dried by milling on warm rubber rolls. It is quite pliable and somewhat rubbery. Its intrinsic viscosity (determined at 25° C. in chloroform at a concentration of 0.1 g./100 ml. of solution) is 0.23 and its composition is 39% carbon monoxide, 45% ethylene, and 16% diethyl maleate by weight. A carbon monoxide/ethylene/diethyl maleate polymer prepared in a similar manner in benzene is tougher and much more rubbery.

*Example 17.*—This example illustrates the preparation of a polymer of carbon monoxide, ethylene, vinyl acetate, and diethyl maleate.

A pressure reaction vessel is charged with 0.5 part of diethyl dioxide, 10 parts of vinyl acetate, 10 parts of diethyl maleate, 50 parts of dioxan, and 50 parts of thiophene-free benzene, closed, evacuated, and pressured to 250 atmospheres with a mixture of carbon monoxide and ethylene which mixture contains 30% carbon monoxide by weight. The temperature of the agitated reaction mixture is raised to 130° C. and maintained at 128° to 130° C. for a period of 5 hours during which the pressure is kept at 600 to 700 atmospheres by occasional repressuring with the mixture of carbon monoxide and ethylene. The vessel is cooled, the excess gases are bled off, and the vessel is opened. The solvents and unreacted monomers are removed from the polymer by distillation with steam and the polymer, yield 18 parts, is dried by milling on warm rubber rolls. Its intrinsic viscosity (determined at 25° C. in chloroform at a concentration of 0.1 g./100 ml. of solution) is 0.67 and its melting point is 110° C. It contains 43% carbon monoxide and 50% ethylene and has a saponification number of 48. A film of the polymer pressed at 70° C. between smooth surfaces is very pliable and quite rubbery and has a tensile strength of 250 lbs. per sq. inch with an elongation at break of 250%. Treatment of the polymer in a hot aqueous dioxan solution with an excess of methanolic potassium hydroxide over the amount required for complete hydrolysis, followed by acidification, provides an alkali-soluble polyacid which softens at 50° C. to 60° C. and sets up at 160° C. in 10 minutes to form a hard, insoluble, infusible product.

*Example 18.*—This example illustrates the preparation of a polymer of carbon monoxide and vinyl acetate.

A pressure reaction vessel is charged with 0.5 part of benzoyl peroxide, 1 part of sodium bisulfite, 50 parts of water, and 50 parts of freshly distilled vinyl acetate, closed, evacuated to about 100 mm., and pressured to 135 atmospheres with carbon monoxide. The temperature of the agitated reaction mixture is raised to 75° C. and maintained at 74° to 76° C. for a period of 8.5 hours during which the pressure is kept at 120 to 125 atmospheres by occasional repressuring with carbon monoxide. The vessel is cooled, the excess gas is bled off, and the vessel is opened. The unreacted vinyl acetate is removed by steam distillation and the product is washed with water and dried. There is thus obtained 26 parts of a hard, brittle polymer which melts at 90° to 95° C. and has an intrinsic viscosity of 0.24 (determined in xylene at 85° C. at a concentration of 0.125 g./100 ml. of solution). The mol ratio of carbon monoxide to vinyl acetate in the polymer is 1:4.4.

*Example 19.*—This example illustrates the preparation of a polymer of carbon monoxide and tetra fluoroethylene.

A pressure reaction vessel is charged with 100 parts of oxygen-free water, 36 parts of isooctane, and 0.2 part of benzoyl peroxide, the charge occupying about 37.5% of the volume of the reaction vessel. The pH of the mixture is adjusted to 3.0 with dilute formic acid. The loading is conducted under a blanket of nitrogen in order to exclude atmospheric oxygen. The reaction vessel is then closed, 200 parts of tetrafluoroethylene is added as a liquid under pressure, and carbon monoxide is admitted to a total pressure of 400 atmospheres. The reaction vessel is agitated and heated to 80° C. for 7.75 hours. The reaction pressure is maintained at 450 to 500 atmospheres by the occasional admission of more carbon monoxide. At the end of this time the reaction vessel is cooled and opened, and the contents are discharged. The product, isolated by steam distillation followed by filtration and drying, is obtained as a heavy white granular powder. It contains 67.7% fluorine, corresponding to 2.3 units of tetrafluoroethylene for each unit of carbon monoxide. Infrared absorption measurements confirm the presence of carbonyl groups. The polymer softens at about 275° C. and at 300° C. melts to a mobile liquid which solidifies on cooling to a brittle wax-like solid. It is insoluble in hot acetic acid, pyridine, nitrobenzene, toluene, chloroform, and formamide, and is not attacked by nitric or sulfuric acids.

*Example 20.*—This example illustrates the preparation of a polymer of carbon monoxide and vinyl chloride.

A pressure reaction vessel is charged with 0.5 part of benzoyl peroxide, 100 parts of water, and 1 part of sodium bisulfite, closed, and evacuated. Then 50 parts of vinyl chloride is added and the vessel is pressured to 350 atmospheres with carbon monoxide. The temperature of the agitated reaction mixture is raised to 75° C. and maintained at 72° to 76° C. for a period of 9.5 hours during which the pressure is kept at 530 to 550 atmospheres by occasional repressuring with carbon monoxide. The vessel is cooled, bled of excess gases, and opened. The yield of polymer, which is collected on a filter and dried, is 3.5 parts. The product is soluble in dioxan, phenol, pyridine, and aqueous sodium hydroxide. It contains 41.9% carbon and 35% chlorine.

*Example 21.*—This example illustrates the preparation of a polymer of carbon monoxide and acrylonitrile.

A pressure reaction vessel is charged with 0.5 part of benzoyl peroxide, 100 parts of an aqueous solution containing 5% hydrochloric acid by weight, and 50 parts of freshly distilled acrylonitrile, closed, evacuated, and pressured to 700 atmospheres with carbon monoxide. The temperature of the agitated reaction mixture is raised to 75° C. and maintained at 67° to 76° for a period of 8 hours during which the pressure is kept at 865 to 910 atmospheres by occasional repressuring with carbon monoxide. The vessel is cooled, bled of excess gases, and opened. The reaction mixture is subjected to steam distillation to remove hydrochloric acid and unreacted monomer. The polymer, yield 23 parts, is collected on a filter and dried. It is a white, infusible and insoluble solid which contains keto groups and is swelled by phenol, formamide, and dimethylformamide. The mol ratio of carbon monoxide to acrylonitrile in the polymer is 1:30.

*Example 22.*—This example illustrates the preparation of a polymer of carbon monoxide and butadiene.

A pressure reaction vessel is charged with 0.5 part of diethyl dioxide and closed. Then 50 parts of butadiene is added and the vessel is pressured to 300 atmospheres with carbon monoxide. The temperature of the agitated reaction mixture is raised to 130° C. and maintained at 130° to 132° C. for a period of 14 hours during which the pressure is kept at 850 to 900 atmospheres by occasional repressuring with carbon monoxide. The vessel is cooled, bled of excess gases, and opened. The yield of rubbery polymer is 23 parts. It contains 18% carbon monoxide by weight.

*Example 23.*—This example illustrates the preparation of a polymer of carbon monoxide and ethylene with atmospheric oxygen as catalyst.

In this example the reaction vessel is neither flushed with nitrogen nor evacuated. The vessel is charged with 100 parts of anhydrous thiophene-free benzene, closed, and pressured to 250 atmospheres with a mixture of ethylene and carbon monoxide which mixture contains 30% carbon monoxide by weight. The temperature of the agitated reaction mixture is raised to 200° C. and maintained at 198° to 204° C. for a period of 16.5 hours during which the pressure is kept at 870 to 900 atmospheres by occasional repressuring with the mixture of carbon monoxide and ethylene. The reaction vessel is cooled, bled of excess gases, and opened. There is obtained 0.4 part of solid polymer in which the mol ratio of ethylene to carbon monoxide is 2:1.

*Example 24.*—This example illustrates the preparation of a polymer of carbon monoxide and ethylene in the presence of atmospheric oxygen with dioxan peroxide as catalyst.

In this example the reaction vessel is neither flushed with nitrogen nor evacuated. The vessel is charged with 100 parts of dioxan containing 0.005% oxygen in peroxide form, closed, and pressured with ethylene to 400 atmospheres and then further with carbon monoxide to 500 atmospheres. The temperature of the reaction mixture is raised to 150° C. and maintained at 148° to 150° C. for a period of 7.5 hours during which the pressure is kept at 800 to 950 atmospheres by occasional repressuring with carbon monoxide. The reaction vessel is cooled, bled of excess gases, and opened. The polymer is collected on a filter, washed with methanol, and dried. The yield of white powdery polymer is 20 parts. The mol ratio of ethylene to carbon monoxide in the product is 4.2:1.

*Example 25.*—This example illustrates the preparation of a polymer of carbon monoxide, ethylene, and tetrafluoroethylene.

A pressure reaction vessel is charged with 0.3 part of ammonium peroxydisulfate, 75 parts of oxygen-free water, and 75 parts of tertiary-butyl alcohol and closed. Then 63 parts of tetrafluoroethylene, 17 parts of ethylene, and 4 parts of carbon monoxide are added. The temperature of the agitated reaction mixture is raised to 60° C. and maintained at 60° C. for a period of 3.5 hours during which the pressure is kept at 1000 to 1400 lbs. per sq. inch by occasional injection of oxygen-free water into the reaction vessel. The vessel is cooled, bled of excess gases, and opened. The yield of dry polymer is 35 parts. The presence of carbonyl groups in the polymer is apparent from its infrared absorption spectrum. A film pressed from the polymer at 315° C. between smooth surfaces has a tensile strength of 6800 lbs. per sq. inch with an elongation at break of 426%.

*Example 26.*—A steel pressure vessel lined with silver is flushed with nitrogen and charged with 2.38 parts of di(tertiarybutyl)peroxide and 80 parts of cyclohexane. The tube is closed, evacuated, placed in a shaker machine, connected to a reservoir containing ethylene admixed with 44% carbon monoxide. Agitation is started, the temperature brought to 135° C., and the pressure adjusted to 1125 lbs. per sq. inch by bleeding in ethylene/carbon monoxide mixed gas from the reservoir. The reactants are maintained at 134° to 137° C. under pressure of 900 to 1125 lbs. per sq. inch for 18 hours. The total pressure drop obtained is 240 lbs. per sq. inch. The reactor is then allowed to cool, opened, the product discharged and subjected to distillation to remove the cyclohexane. There is thus obtained 16 parts of a viscous liquid ethylene/carbon monoxide polymer which analyzes 72.04% carbon and 9.83% hydrogen. From these data it may be calculated that the ethylene/carbon monoxide polymer contains 31.7% carbon monoxide and 68.3% ethylene.

*Example 27.*—A pressure-resistant vessel is charged with 2 cc. di(tertiarybutyl)peroxide, 100 cc. water, 100 g. propylene, and heated under a carbon monoxide pressure of 890 to 1000 atmospheres at a temperature of 133° to 136° C. for about 18 hours. The resulting product is removed from the reaction vessel and the water layer is separated therefrom. The liquid organic layer is subjected to the action of steam for from 3 to 4 hours to remove absorbed propylene. The resulting polymer is dried under diminished pressure at 100° C. for 4 hours. The product thus obtained is a liquid propylene/carbon monoxide polymer, weight 25 g., analyzing as follows: 74.62% carbon; 10.65% hydrogen; 25.6% carbon monoxide; ratio of propylene: carbon monoxide, 1.94:1. This polymer has a molecular weight in the range of 2040 to 2360.

As illustrated by some of the above examples, ethylene/carbon monoxide polymers prepared from ethylene/carbon monoxide gas mixtures containing less than about 47% carbon monoxide by weight contain higher proportions of carbon monoxide than do the monomer mixtures from which they are prepared. Ethylene/carbon monoxide polymers prepared from ethylene/carbon monoxide gas mixtures containing more than about 47% carbon monoxide by weight contain lower proportions of carbon monoxide than do the monomer mixtures from which they are prepared. Generally an ethylene/carbon monoxide gas composition containing about 46 to 47% carbon monoxide by weight yields homogeneous ethylene/carbon monoxide polymers of about the same carbon monoxide content as the monomer mixture.

The properties of the carbon monoxide liquid and/or solid polymers provided by the process of this invention vary widely depending on the polymer components and the proportions in which they are used, and the nature and amount of the reaction medium used, the reaction temperature and pressure, and the nature and amount of catalyst employed. The products are useful in a wide variety of applications, including unsupported films, adhesives, safety glass interlayers, fibers, molded objects, plasticizers, protective coatings, etc. They may be compression or injection molded, melt extruded, or calendered. They may be applied to porous or nonporous substrata in solution or emulsion form by casting, brushing, spraying, dipping, etc. In many cases their utility in specific applications may be enhanced by blending them in solution or milling them with plasticizers, organic or inorganic fillers, pigments, chemical modifying agents, other organic polymers, etc. Soluble polymers of carbon monoxide and ethylene are useful in the form of thin coatings on iron or steel to inhibit corrosion, particularly during outdoor exposure.

Since the carbon monoxide polymers of this invention contain ketone groups, they can be modified chemically by treatment with a wide variety of chemical agents which normally react with ketones. Thus, by reaction with formaldehyde or its derivatives there are obtained methylol ketones which, when molded at elevated temperatures with or without fillers in the presence of hexamethylenetetramine or acidic catalysts such as phthalic or maleic anhydride or without a catalyst, form hard, insoluble, infusible products. Soluble products of the reaction of the polyketones of this invention with formaldehyde or its derivatives are particularly useful as plywood adhesives, especially when used with an acidic catalyst such as phthalic or maleic anhydride. By reaction of the polyketones of this invention with acrylonitrile there are obtained derivatives which contain nitrile groups and can be hydrolyzed to polyacids. By treatment under suitable conditions with basic materials, that is, materials whose aqueous solutions have a pH greater than 7, such as ammonia, amines, sodium hydroxide, potassium hydroxide, sodium carbonate, etc., the soluble polyketones of this invention may be converted into insoluble products. Valuable thermosetting compositions are obtained when the polyketones of this invention are compounded in the dry state with a solid diamine like meta-phenylenediamine. Oximes are obtained by reaction of the polyketones of this invention with hydroxylamine. Hydrogenation of the polyketones of this invention over suitable catalysts such as copper chromite, ruthenium oxide, or reduced nickel chloride results in conversion of at least a portion of the ketone groups to alcoholic hydroxyl groups. Treatment of an olefin/carbon monoxide polymer containing a relatively high proportion (30 to 50% by weight) of carbon monoxide with boiling acetic anhydride, particularly in the presence of traces of a strong acid like phosphoric acid, results in the formation of polymeric products containing furan groups. When the soluble polyketones of this invention are heated with about 1% or more by weight of an organic peroxide like benzoyl peroxide they become insoluble and, in many cases, stronger and more pliable. The temperature at which they become tacky is also raised by this treatment. When olefin/carbon monoxide polymers are treated with a stronger oxidizing agent like hot 70% nitric acid, they are oxidized to dibasic acids which may be viscous liquids, greasy solids, or hard waxes and may have molecular weights as high as 2000 or higher. Incomplete oxidation of olefin/carbon monoxide polymers yields acids containing ketone groups.

Various changes may be made in the methods and preferred embodiments of this invention without departing therefrom or sacrificing the advantages thereof.

I claim:

1. A process for the preparation of polymerization products which comprises heating together carbon monoxide with a polymerizable organic compound containing ethylenic unsaturation in the presence of a per-oxy compound catalyst, and in the absence of a Friedel-Crafts catalyst, said compound containing ethylenic unsaturation being one which undergoes addition polymerization when subjected to the polymerizing action of a per-oxy compound.

2. A process for the preparation of polymerization products which comprises heating together carbon monoxide substantially free of metal carbonyl with an aliphatic monoolefin, in the presence of a per-oxy compound catalyst, and in the absence of a Friedel-Crafts catalyst, at a temperature between 25° and 350° C.

3. A process for the preparation of polymerization products which comprises heating together carbon monoxide and ethylene, in the presence of a per-oxy compound catalyst, and in the absence of a Friedel-Crafts catalyst, at a temperature between 25° and 350° C.

4. A normally solid interpolymer of carbon monoxide with an aliphatic monoolefin.

5. A normally solid orientable polymer of carbon monoxide with an aliphatic monoolefin.

6. A normally solid polymer of carbon monoxide with ethylene.

7. A process for preparing polymers which comprises heating carbon monoxide with at least one peroxide-polymerizable organic compound containing ethylenic unsaturation in the presence of a per-oxy compound catalyst in the absence of a Friedel-Crafts catalyst under superatmospheric pressure at a temperature within the range of 25° to 350° C., said compound containing ethylenic unsaturation being one which undergoes addition polymerization when subjected to the polymerizing action of a per-oxy compound.

8. A process for preparing polymers which comprises heating carbon monoxide substantially free of metal carbonyl with a monoolefin in the presence of a per-oxy compound catalyst in the absence of a Friedel-Crafts catalyst under superatmospheric pressure at a temperature within the range of 25° to 350° C., separating the resultant polymer from the reaction mixture, and thereafter subjecting the said polymer to a stress whereby it becomes oriented.

9. A process for the preparation of normally solid ethylene/carbon monoxide interpolymers which comprises heating together carbon monoxide and ethylene in the presence of a per-oxy compound catalyst and in the absence of a Friedel-Crafts catalyst under a pressure within the range of 500 to 1500 atmospheres, a a temperature between 25° and 350° C.

10. A normally solid orientable interpolymer of carbon monoxide with a polymerizable organic compound containing ethylenic unsaturation, said interpolymer being characterized in that the carbon monoxide is combined therein in the form of a plurality of carbonyl groups, said compound containing ethylenic unsaturation being one which undergoes addition polymerization across the >C=C< group when subjected to the polymerizing action of a per-oxy compound.

11. A coated article comprising a base material carrying a protective coating containing as an essential ingredient a normally solid polymer of carbon monoxide with ethylene.

12. An interpolymer of carbon monoxide with ethylene, said interpolymer being characterized in that it has a polyketone structure.

13. An interpolymer of carbon monoxide with an aliphatic monoolefin, said interpolymer being characterized in that it has a polyketone structure.

14. An interpolymer of carbon monoxide with a polymerizable compound containing ethylenic unsaturation, said compound containing ethylenic unsaturation being one which undergoes addition polymerization across the >C=C< group when subjected to the polymerizing action of a per-oxy compound, said interpolymer being characterized in that it has a polyketone structure.

15. An interpolymer formed from comonomers consisting of carbon monoxide and organic polymerizable comonomer having at least one terminal methylene group, said interpolymer being characterized in having a polyketone structure.

MERLIN M. BRUBAKER.

REFERENCES CITED

The following references are of record in the file of this patent:

UNITED STATES PATENTS

| Number | Name | Date |
|---|---|---|
| 2,352,328 | Kleine | June 27, 1944 |